United States Patent
Ku

(10) Patent No.: US 7,313,888 B2
(45) Date of Patent: Jan. 1, 2008

(54) DEVICE FOR AND METHOD OF PREVENTING RATTLING OF DOOR WINDOW GLASS FOR VEHICLES

(75) Inventor: Ja Kyung Ku, Hwaseong-si (KR)

(73) Assignee: Kia Motors Corporation, Seoul (KR)

( * ) Notice: Subject to any disclaimer, the term of this patent is extended or adjusted under 35 U.S.C. 154(b) by 183 days.

(21) Appl. No.: 11/025,478

(22) Filed: Dec. 29, 2004

(65) Prior Publication Data
US 2005/0252091 A1   Nov. 17, 2005

(30) Foreign Application Priority Data
May 13, 2004   (KR) ............... 10-2004-0033762

(51) Int. Cl.
*E05B 7/16*   (2006.01)
(52) U.S. Cl. .......... 49/414; 49/440; 49/478.1; 49/506; 277/629; 277/921
(58) Field of Classification Search .......... 49/374, 49/478.1, 428, 414, 440, 415, 506; 277/629, 277/921; 16/DIG. 6
See application file for complete search history.

(56) References Cited

U.S. PATENT DOCUMENTS

| | | | | |
|---|---|---|---|---|
| 2,132,104 A | * | 10/1938 | Froeliger | ............ 49/415 |
| 2,446,336 A | * | 8/1948 | Mark et al. | ............ 49/395 |
| 3,068,875 A | * | 12/1962 | Lovercheck | ....... 134/58 DL |
| 3,487,581 A | * | 1/1970 | Ellingson, Jr. | ......... 49/478.1 |
| 3,926,332 A | * | 12/1975 | Okamoto | .......... 220/226 |
| 5,702,533 A | * | 12/1997 | Mundt et al. | ........... 118/733 |
| 5,979,828 A | * | 11/1999 | Gruensfelder et al. | ... 244/129.1 |
| 2005/0198904 A1 | * | 9/2005 | Browne et al. | ........... 49/374 |
| 2005/0230925 A1 | * | 10/2005 | Browne et al. | .......... 277/919 |

FOREIGN PATENT DOCUMENTS

JP   8-58380   * 8/1994

* cited by examiner

Primary Examiner—Gregory J. Strimbu
(74) Attorney, Agent, or Firm—Morgan Lewis & Bockius LLP

(57) ABSTRACT

A device for preventing rattling of a door window glass for vehicles. In an activated condition, i.e. upon the upward and downward movement of the window glass, smoother upward and downward movement of the window glass is enabled, thereby eliminating noise due to frictional contact between the window glass and the weatherstrip. In an inactivated or stopped condition of the window glass, the inside walls of the weatherstrip are supportedly brought into close contact with the surfaces of the window glass, thereby also eliminating noise due to rattling of the window glass caused by external factors such as wind, etc.

4 Claims, 10 Drawing Sheets

DEVICE FOR AND METHOD OF PREVENTING RATTLING OF DOOR WINDOW GLASS FOR VEHICLES

CROSS REFERENCE TO RELATED APPLICATIONS

This application is based on, and claims priority to Korean Application No. 2004-0033762, filed on May 13, 2004, the disclosure of which is hereby incorporated by reference.

BACKGROUND OF THE INVENTION

1. Field of the Invention

The present invention relates to a device for preventing noise from a door window glass for vehicles, and more particularly to a device for preventing noise from a door window glass for vehicles, in which a pair of magnetic means are installed within a door window glass weatherstrip (hereinafter, referred to as "weatherstrip") of a door trim in such a manner as to be positioned at the opposite lateral sides of an inner weatherstrip portion, which defines a spatial channel through which a door window glass (hereinafter, referred to as a "window") is moved upwardly and downwardly, so that the magnetic means pair causes the channel to be resiliently widened laterally in an activated condition of the window (i.e., upon the upward and downward movement of the window). This widening of the channel aids in avoiding close contact between the window and the inner weatherstrip portion so as to reduce noise due to friction between the weatherstrip and the window ascending and descending. The magnetic means also causes the inner weatherstrip portion to be resiliently pushed toward the window when the window is in an inactivated(or stopped) condition such that the inner weatherstrip portions are supportedly brought into close contact with the window, thereby eliminating noise due to window rattles caused by external factors such as wind, etc.

2. Background of the Related Art

In general, for power windows applied to a vehicle door, a motor is driven by operator manipulation of a one-touch UP/DOWN switch and a door window is automatically moved upwardly and downwardly by virtue of cooperative operation with a linkage and a wire connected to the motor. A component for a channel through which the window is moved upwardly and downwardly is a door window glass weatherstrip installed at the inside of a door trim. The window is slidably moved upwardly and downwardly along the channel with its side ends inserted into the weatherstrip such that opposite inner and outer surfaces thereof abut against two confronting side surfaces of the weatherstrip. The weatherstrip is formed of a rubber material. Between the two confronting inside surfaces of the weatherstrip is defined a spatial channel (hereinafter, referred to as "channel") into which both side ends of the window is inserted for the upward and downward movement of the window. Thus, the window is slidably moved upwardly and downwardly along the channel by virtue of actuation of the UP/DOWN switch for the power windows.

However, such a conventional weartherstrip structure is problematic in that frictional noise is caused by aging of the weatherstrip due to the opposite inner and outer surfaces of both side end portions of the window being in close contact with the two confronting inside surfaces of the weatherstrip upon the upward and downward movement of the window. In this case, the window requires a stronger force for the upward and downward movement thereof in view of such frictional contact force, which in turn requires a large-capacity motor for power windows.

Additionally, when a partially opened window experiences an external force such as wind, etc., the window rattles at both side end portions in the channel of the weatherstrip, and simultaneously generates noise. Therefore, the present invention has been made to solve the above problems occurring in the prior art, and it is an object of the present invention to provide a device for preventing noise from a door window glass for vehicles, in which in an activated condition (i.e., upon the upward and downward movement of the window), smoother upward and downward movement of the window is enabled, thereby eliminating noise due to frictional contact between the window and the weatherstrip, and in an inactivated or stopped condition of the window, the confronting inside walls of the inner weatherstrip portion are supportedly brought into close contact with the opposite surfaces of the window, thereby also eliminating noise due to window rattles caused by external factors such as wind, etc.

SUMMARY OF THE INVENTION

To accomplish the above object, the present invention provides a weatherstrip with an inner portion having an end wall, and a pair of confronting inside walls extending from both ends of the end wall in such a fashion as to be parallel to each other, and so that the end wall and the pair of confronting inside walls cooperatively define therebetween a channel for allowing a door window to be upwardly and downwardly moved therealong. The weatherstrip also has an outer portion with a pair of opposite outside walls outwardly extending from the two confronting side walls of the inner portion to be formed integrally with the inner portion; a first hollow part formed by one confronting side wall with the outside wall from which it extends; a second hollow part formed by the other confronting side wall with the outside wall from which it extends; a first magnetic means fixedly mounted in the first hollow part; a second magnetic means rotatably positioned in the second hollow part; a small electric motor connected to an upper end of the second magnetic means disposed in the second hollow part and adapted to provide a rotational force to the second magnetic means; and a control means connecting the electric motor and adapted to control the power supply and the driving time for the electric motor.

In one embodiment, each of the first and second magnetic means may be formed of a long-sized permanent magnet which is disposed at the first and second hollow parts along a longitudinal direction of the weatherstrip and has a polarity oriented perpendicular to the channel in a transverse direction of the weatherstrip. In another embodiment, a window UP/DOWN switch and an ETAC may be sequentially connected to the electric motor as the control means for controlling the power supply and the driving time for the electric motor. The first magnetic means may be disposed at the first hollow part of the weatherstrip in such a fashion as to be integrally attached to one confronting inside wall surface of the inner weatherstrip portion.

According to a further embodiment of the present invention, there is additionally provided a method of preventing noise from a door window glass for vehicles, wherein when the door window glass is in an inactivated condition, the first and second magnetic means attract each other while being oriented to have different polarities facing each other, and simultaneously resiliently push the inner portion of the weatherstrip toward the window such that the inner portion of the weatherstrip is supportedly brought into close contact with the opposite inner and outer surfaces of the window. When the door window glass is in an activated condition by the turning on of a power window switch, power is supplied to the electric motor to drive the electric motor to rotate the second magnetic means so that the first and second magnetic means have identical polarities facing each other. This in turn causes the first and second magnetic means to repel each other and simultaneously resiliently pull the inner portion of the weatherstrip in close contact with the window surfaces so that the inner portion of the weatherstrip is detached away from the opposite inner and outer surfaces of the window. In another embodiment, the first and second magnetic means may be a permanent magnet.

In yet another embodiment, there is provided a control means connected to the first and second magnetic means and adapted to enable the supply of current to the first and second magnetic means. There is also provided a plurality of resilient means consisting of a first group of resilient means disposed in the first hollow part and a second group of resilient means disposed in the second hollow part, the first and second group of resilient means being integrally attached at one end to the inner surfaces of the opposite outside walls of the outer weatherstrip portion and connected at the other end to the outer peripheral surface of the first and second magnetic means, respectively, and adapted to resiliently push the first and second magnetic means toward the window. In a further embodiment, each of the first and second magnetic means may be an electromagnet.

In another embodiment, the control means may include a window UP/DOWN switch and an ETACS sequentially connected to the second magnetic means; and a conductive wire via which battery current is applied to the second magnetic means under the control of the ETACS when the window UP/DOWN switch is turned on and which is adapted to connect the first and second magnetic means to each other to thereby allow the battery current to flow from the second magnetic means to the first magnetic means.

According to yet another embodiment of the present invention, when the door window glass is in an inactivated mode and a power window switch is turned off, the first and second magnetic means are not supplied with current, so that compressed springs cause the first and second magnetic means to resiliently push the two confronting inside walls of the inner weatherstrip portion toward the window such that the two confronting inside wall surfaces of the inner weatherstrip portion are brought into close contact with the opposite inner and outer surfaces of the window. When the door window glass is in an activated mode and a power window switch is turned on, current sequentially flows from the first magnetic means to the second magnetic means so that the line of magnetic force is arranged perpendicular to the flow direction of the current (i.e., the transverse direction of the channel), and the magnetic force causes the first magnetic means and the second magnetic means to repel each other and to resiliently compress the springs and simultaneously to cause the two confronting inside walls of the inner weatherstrip portion integrally attached with the first magnetic means and the second magnetic means to be resiliently pulled outwardly, respectively. The two confronting inside walls of the inner weatherstrip portion are then resiliently pulled outwardly by the magnetic force and the channel is simultaneously laterally widened, so that the frictional contact between the two confronting inside walls of the inner weatherstrip portion and the opposite inner and outer surfaces of the window is avoided. Hence, the upward and downward movement of the window is carried out without any friction between the weatherstrip and window, thereby preventing frictional noise due to window rattles upon the upward and downward movement of the window. In yet another embodiment, each of the first and second magnetic means may be an electromagnet.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 2A and 2B are cross-sectional views taken along the line 2-2 of FIG. 1, wherein FIG. 2A is a view showing the present invention operating in an inactivated (or stopped) condition of a window, and FIG. 2B is a view showing the present invention operating in an activated (or upwardly and downwardly moved) condition of a window;

FIGS. 3A and 3B are schematic views illustrating the inner construction of the present invention and the connection relation between elements thereof in accordance with an embodiment of the present invention, wherein FIG. 3A is a view showing the present invention operating in an inactivated (or stopped) condition of a window, and FIG. 3B is a view showing the present invention operating in an activated (or upwardly and downwardly moved) condition of a window;

FIGS. 5A and 5B are cross-sectional views taken along the line 5-5 of FIG. 4, wherein FIG. 5A is a view showing the present invention operating in an inactivated (or stopped) condition of a window, and FIG. 5B is a view showing the present invention operating in an activated (or upwardly and downwardly moved) condition of a window; and FIGS. 6A and 6B are schematic views illustrating the inner construction of the inventive device and the connection relation between elements thereof in accordance with another embodiment of the present invention, wherein FIG. 6A is a view showing the present invention operating in an inactivated (or stopped) condition of a window, and FIG. 6B is a view showing the present invention operating in an activated (or upwardly and downwardly moved) condition of a window.

DETAILED DESCRIPTION OF THE PREFERRED EMBODIMENT

Reference will now be made in detail to the preferred embodiment of the present invention with reference to the attached drawings.

A central bent portion of a weatherstrip, which defines a channel through which a door window is slidably moved upwardly and downwardly, is resiliently widened laterally in an activated condition of the window (i.e., upon the upward and downward movement of the window) to thereby suppress noise generated upon the upward and downward movement of the window. Additionally, the central bent weatherstrip portion is to be resiliently pushed toward the window in an inactivated (or stopped) condition of the window such that two confronting inside surfaces of the central bent weatherstrip portion are supportedly brought into close contact with opposite inner and outer surfaces of the window, to thereby prevent noise due to window rattles although external factors such as wind, etc., are exerted on the window.

Figure 1:
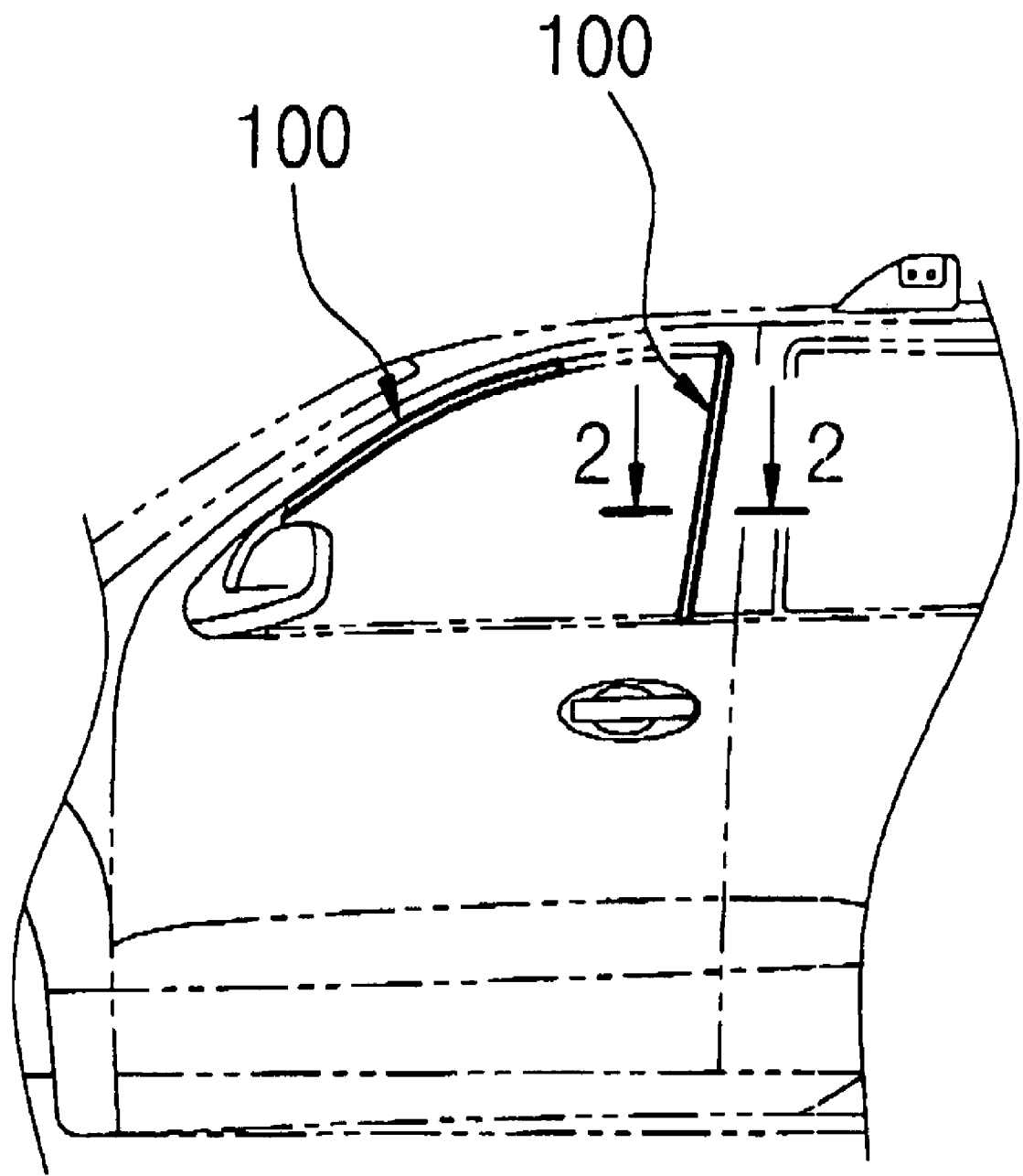
FIG. 1 is a schematic front view illustrating a vehicle door in which a device for preventing noise from a window for vehicles is to be installed in accordance with an embodiment of the present invention.
Figure 3A:
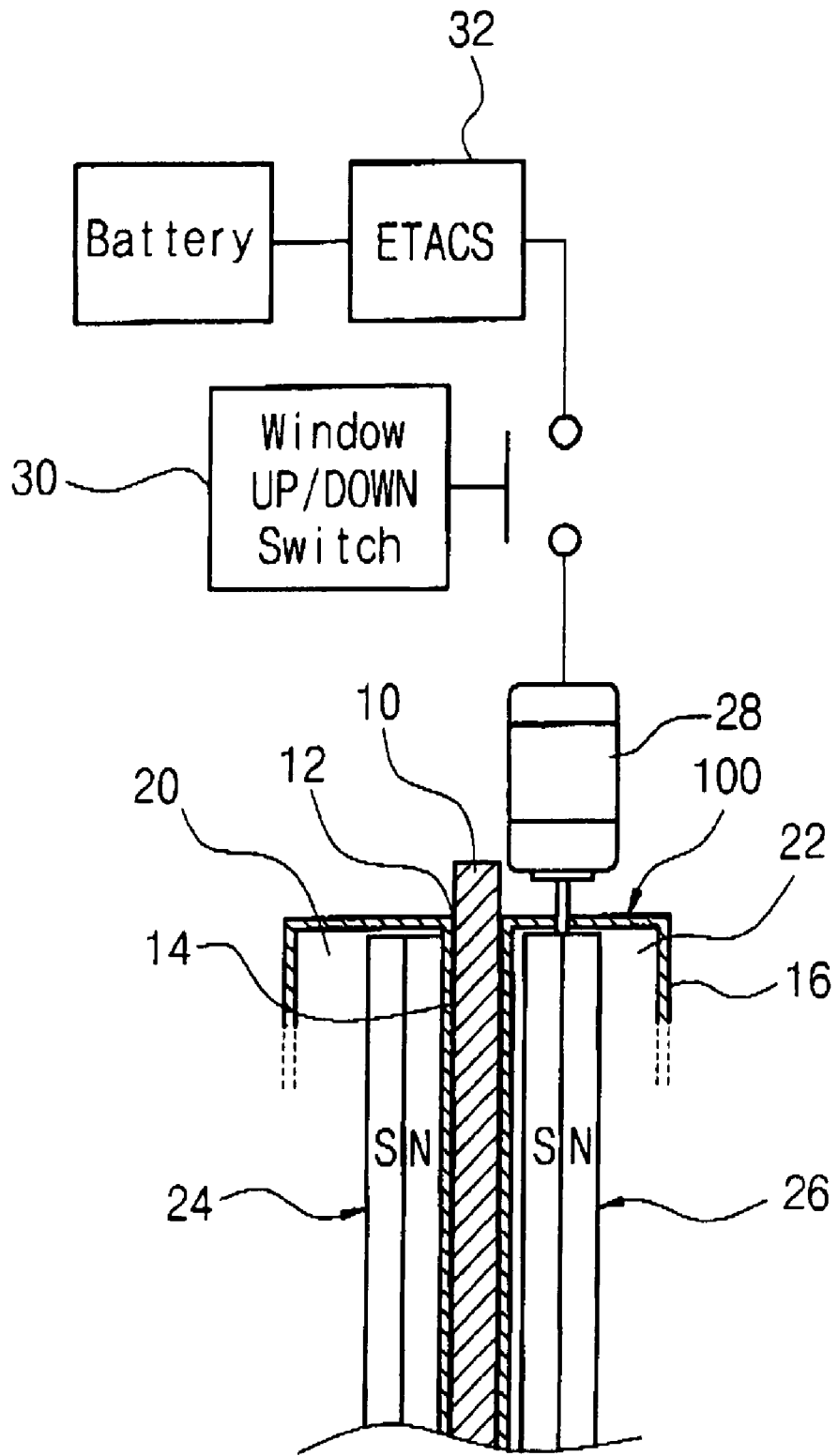
Figure 3B:
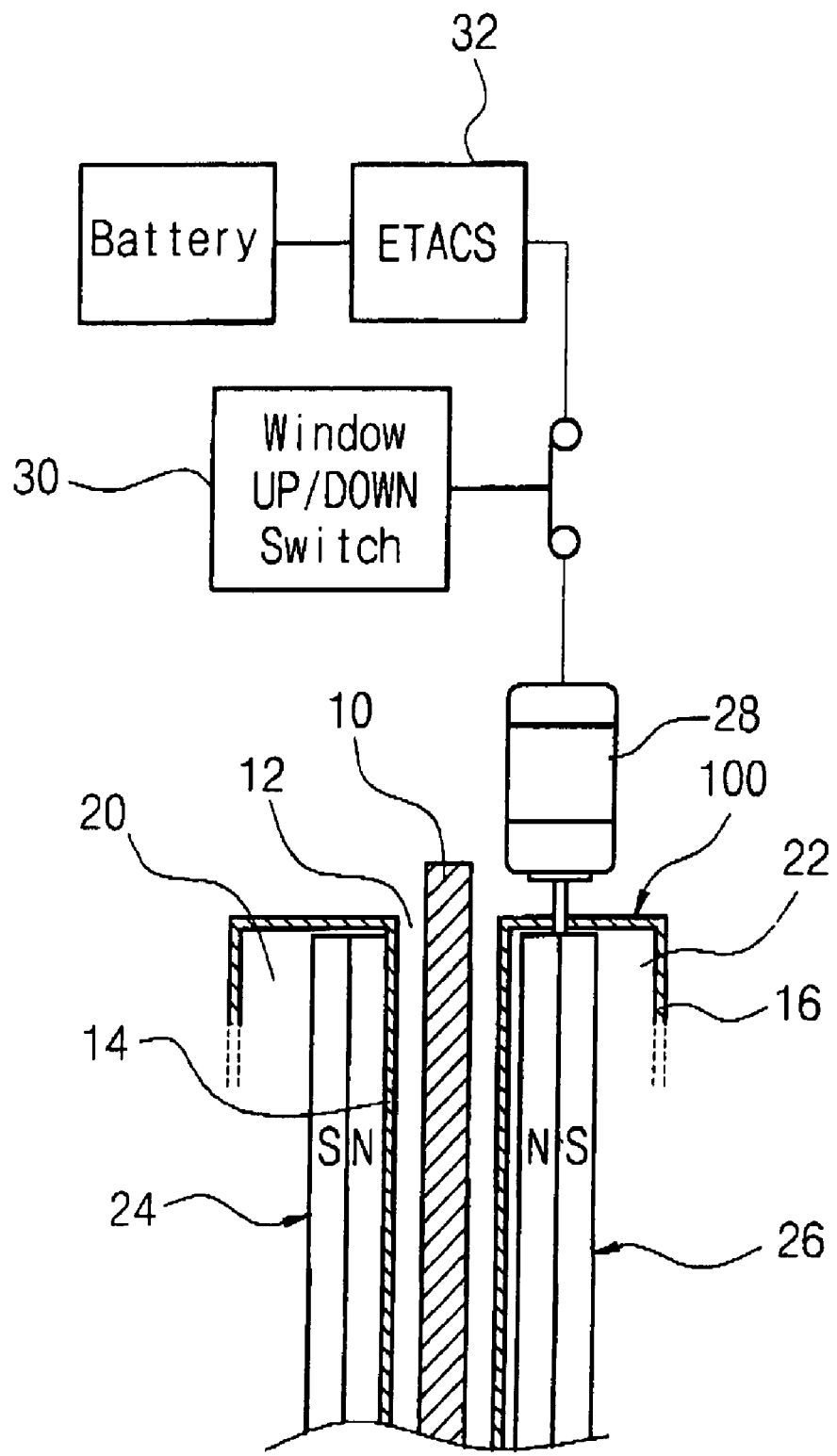

The construction of a first embodiment of the present invention will now be described. FIG. 1 is a schematic front view of a vehicle door in which a device for preventing noise from a window for vehicles is to be installed in accordance with an embodiment of the present invention, and FIGS. 3A and 3B schematically illustrate the inner construction of the inventive device and the connection relation between elements thereof in accordance with such an embodiment of the present invention.

A door window weatherstrip 100 is typically formed of a rubber material suitable for the smooth upward and downward movement of the window. The door weatherstrip 100 is centrally formed with a channel 12 into which both side ends of the window are inserted to allow the window to ascend and descend therealong. The channel 12 is contoured in the shape of an elongated groove that is inwardly formed at the center of the weatherstrip 100 along a longitudinal direction of the weatherstrip 100.

More specifically, the weatherstrip 100 includes an inner portion 14 having a U-shaped cross-section, consisting of an end wall and a pair of confronting inside walls extending from both ends of the end wall in such a fashion as to be parallel to each other, so that the end wall and the pair of confronting inside walls cooperatively define therebetween a channel 12 for allowing a door window to be upwardly and downwardly moved therealong, and an outer portion 16 having a pair of opposite outside walls outwardly extending from the two confronting side walls of the inner portion 12 to be formed integrally with the inner portion 14, so that one of the opposite outside walls and the confronting inside wall from which it extends define therebetween a first hollow part 20, and the other confronting inside wall and the other opposite outside wall define therebetween a second hollow part 22.

In this case, the channel 12 is disposed between the first hollow part 20 and the second hollow part 22 in such a fashion that it is separated from the first hollow part 20 and the second hollow part 22 by the pair of confronting inside walls of the inner portion 14. Here, a first magnetic means 24 and a second magnetic means 26 are mounted at the first hollow part 20 and the second hollow part 22, respectively. Each of the first and second magnetic means 24 and 26 is formed of a long-sized permanent magnet which is disposed at the first and second hollow parts 20 and 22 along a longitudinal direction of the weatherstrip 100 and has a polarity oriented perpendicular to the channel in a transverse direction of the weatherstrip 100 (at the nearer or farther side of the channel). More specifically, the first and second magnetic means 24 and 26 attract each other while having different polarities in an inactivated condition where the window is stopped in movement, and repels each other while having identical polarities in an activated condition where the window is operated (i.e., moved upwardly and downwardly).

The first magnetic means 24 is integrally attached to one surface of the confronting inside wall of the weatherstrip 100 in the first hollow part 20, the second magnetic means 26 disposed in the second hollow part 22 is connected at an upper end thereof to a small electric motor 28 for receiving a rotational force from the electric motor. In the meantime, a window UP/DOWN switch 30 and an electronic time and alarm control system (hereinafter, referred to as "ETACS") 32 are sequentially connected to the electric motor 28 as a control means for controlling the power supply and the driving time for the electric motor 28.

Figure 2A:
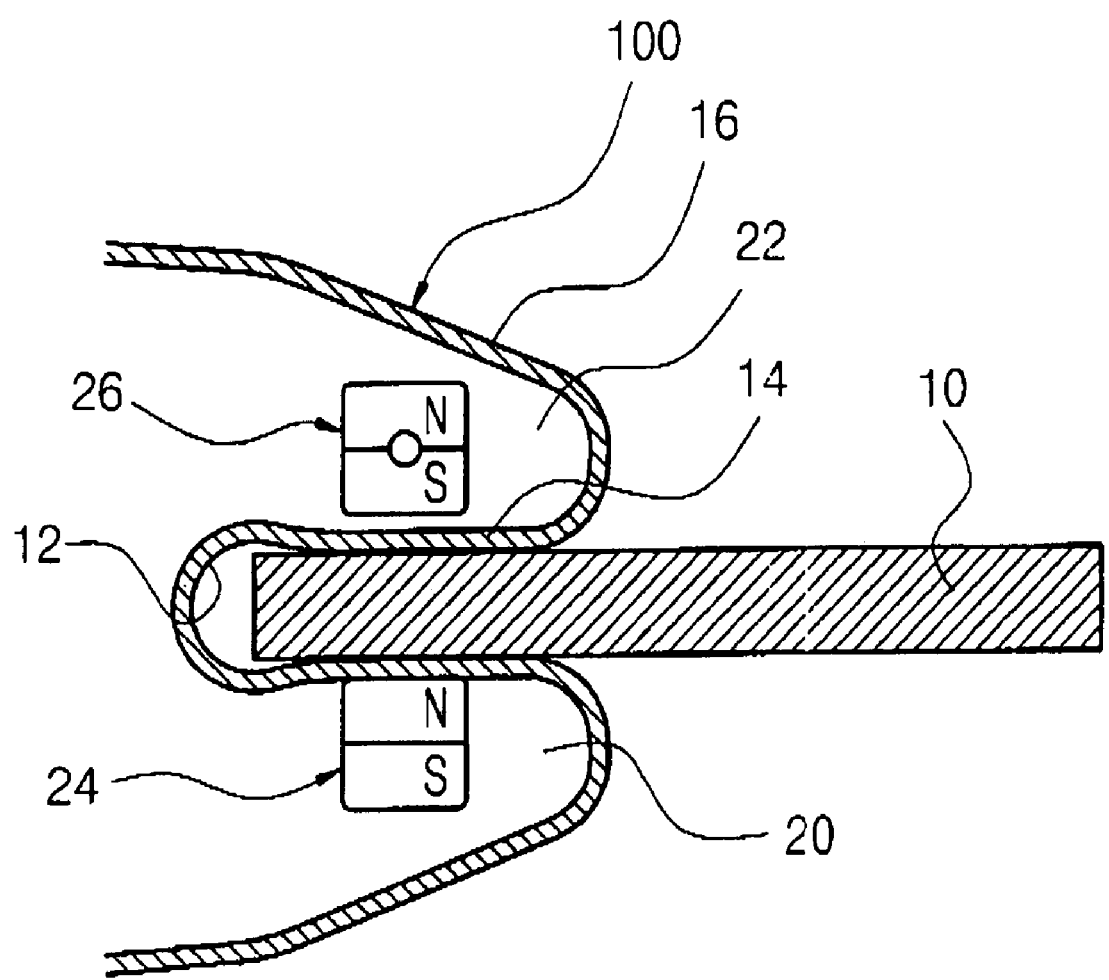
Figure 2B:
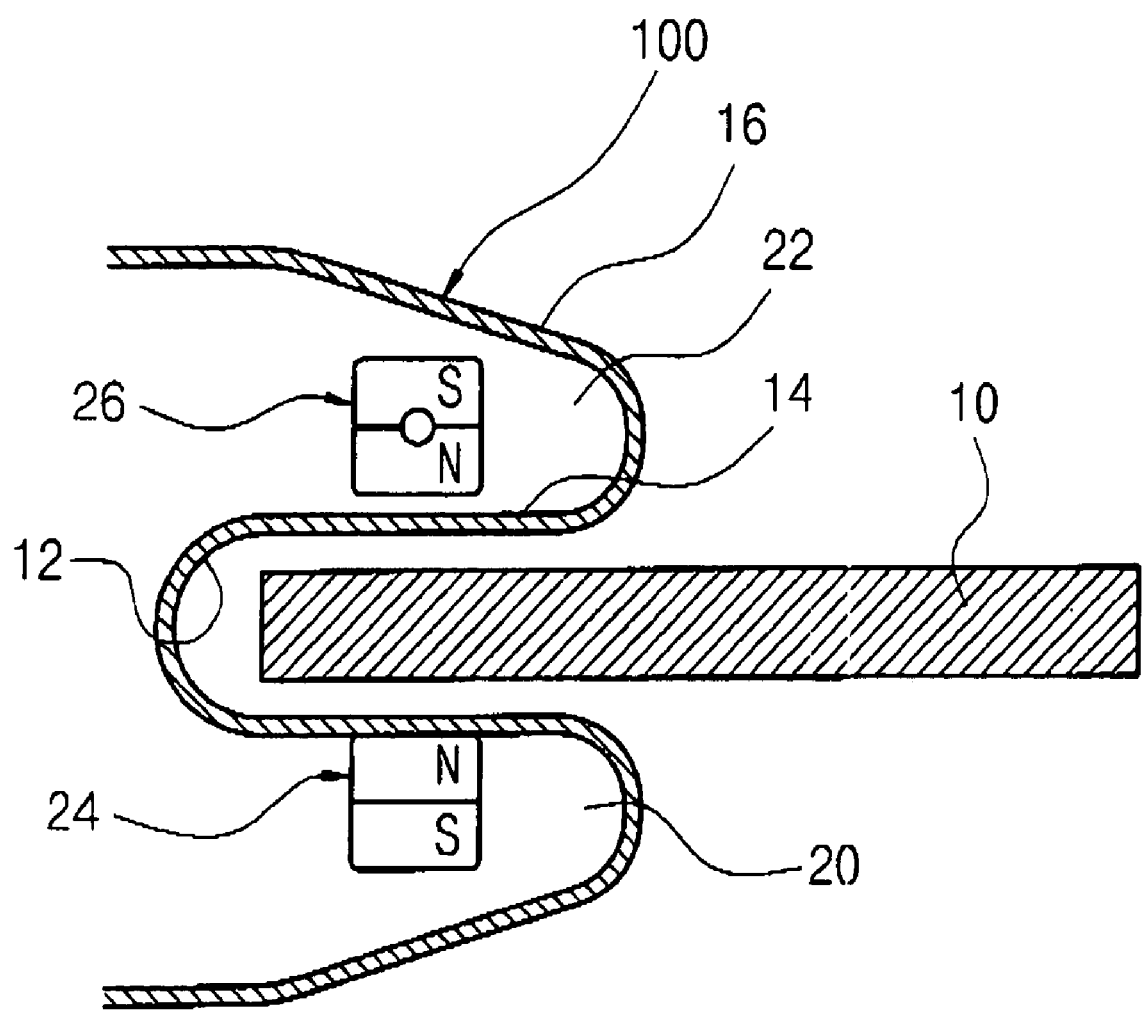

Now, the operation of this embodiment of the present invention will now be described with reference to FIGS. 2A and 2B. FIGS. 2A and 2B are cross-sectional views taken along the line 2-2 of FIG. 1, wherein FIG. 2A is a view showing the present invention operating in an inactivated (or stopped) condition of a window, and FIG. 2B is a view showing the present invention operating in an activated (or upwardly and downwardly moved) condition of a window.

First, for an inactivated (stopped) mode of the window, the first and second magnetic means 24 and 26 consisting of a permanent magnet attract each other while being oriented to have different polarities facing each other, simultaneously pushing the inner portion 14 of the weatherstrip 100 toward the window 10 such that the two confronting inside walls are supportedly brought into close contact with both surfaces of the window 10, respectively, to thereby prevent window rattles in spite of external factors such as wind exerted on the window. More specifically, the opposite surfaces of the first magnetic means 24 and the second magnetic means 26, for example, the inner surface (facing the channel 12) of the first magnetic means 24 and the inner surface (facing the channel 12) of the second magnetic means 26 have a north(N)-pole and a south(S)-pole, respectively, so that the first and second magnetic means 24 and 26 attract each other and simultaneously resiliently push the two confronting inside walls of the inner portion 14 to be brought into close contact with the opposite inner and outer surfaces of the window 10. Accordingly, the window 10 is not moved in spite of an external force such as wind exerted thereto to thereby prevent noise due to conventional window rattles.

On the other hand, for an activated (moved) mode of the window, when a power window switch (i.e., the window UP/DOWN switch 30) is turned on, a battery supplies power to the electric motor 28 under the control of the ETACS 32 to drive the electric motor 28, at which time a rotational force according to the driving of the electric motor 28 is transmitted to the second magnetic means 26. The second magnetic means 26 then rotates by 180 degrees about its center shaft by virtue of the driving of the electric motor 29, and the inner surfaces of the first and second magnetic means 24 and 26 have an identical pole while facing each other, respectively, so that the first and second magnetic means 24 and 26 repel each other and simultaneously resiliently pull the two confronting inside walls of the inner portion 14 to be detached from the opposite inner and outer surfaces of the window 10. For example, in the inactivated mode of the window 10 in which the inner surface (facing the channel 12) of the first magnetic means 24 has an N-pole and the inner surface (facing the channel 12) of the second magnetic means 26 has an S-pole, when the second magnetic means 26 rotates by 180 degrees, the facing surfaces of the first and second magnetic means 24 and 26 have an identical N-pole to effect a repulsive action with respect to each other.

In this case, as mentioned above, the first magnetic means 24 is attached to the associated confronting inside wall surface of the weatherstrip 100. Thus, the two confronting inside walls of the inner weatherstrip portion 14 are laterally widened toward the first and second magnetic means 24 and 26, respectively, as the first and second magnetic means 24 and 26 repel each other, which results in an increase in the width of the channel 12 of the weatherstrip 100, thereby avoiding frictional contact between the confronting inside wall surfaces of the inner weatherstrip portion 14 and the opposite inner and outer surfaces of the window 10. Resultantly, the window 10 is smoothly moved upwardly and downwardly along the channel 12 without friction between the window surfaces and the confronting inside wall surfaces of the inner weatherstrip portion 14.

Figure 4:
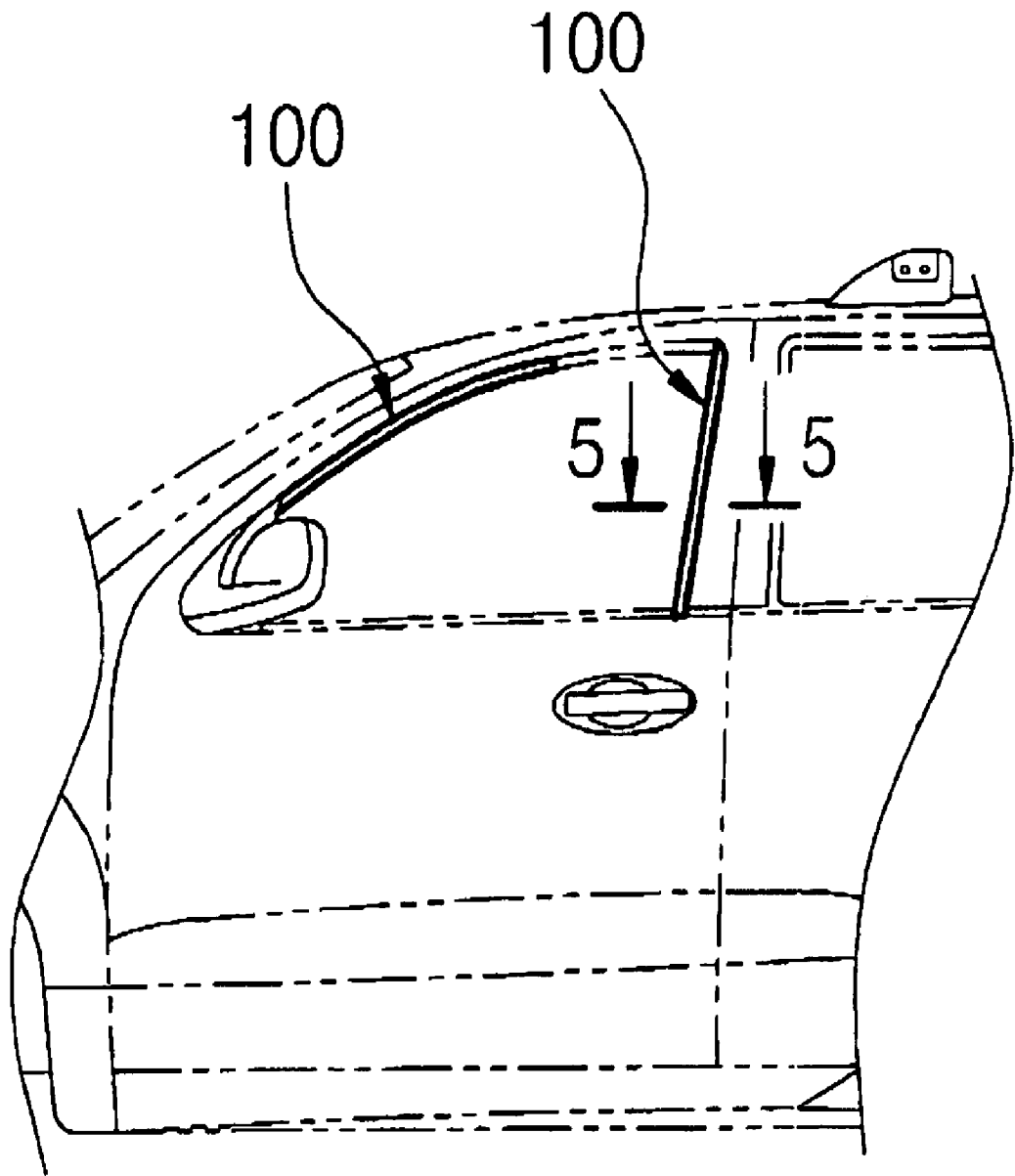
FIG. 4 is a schematic front view illustrating a vehicle door in which a device for preventing noise from a window for vehicles is to be installed in accordance with a second embodiment of the present invention.
Figure 6A:
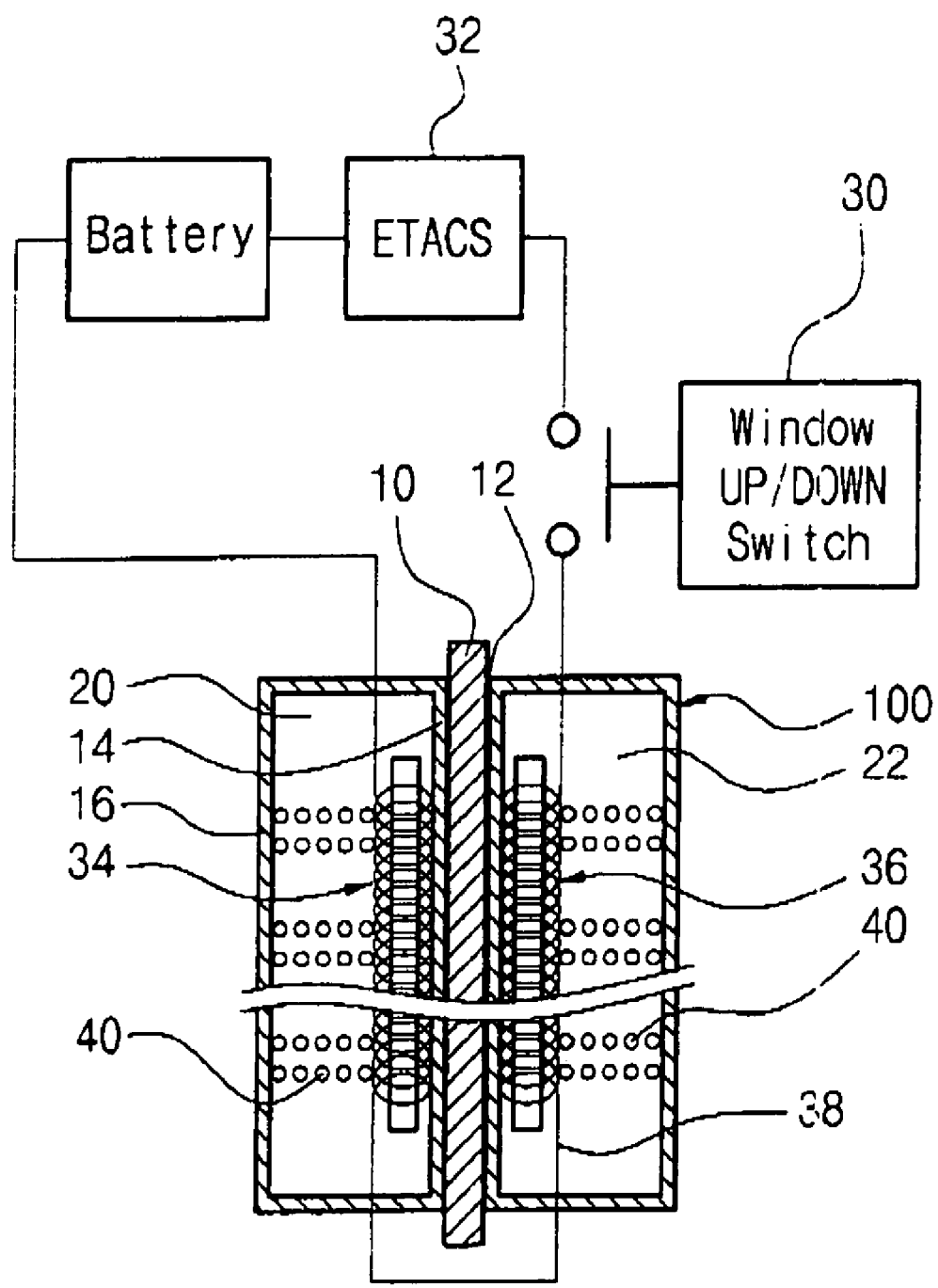
Figure 6B:
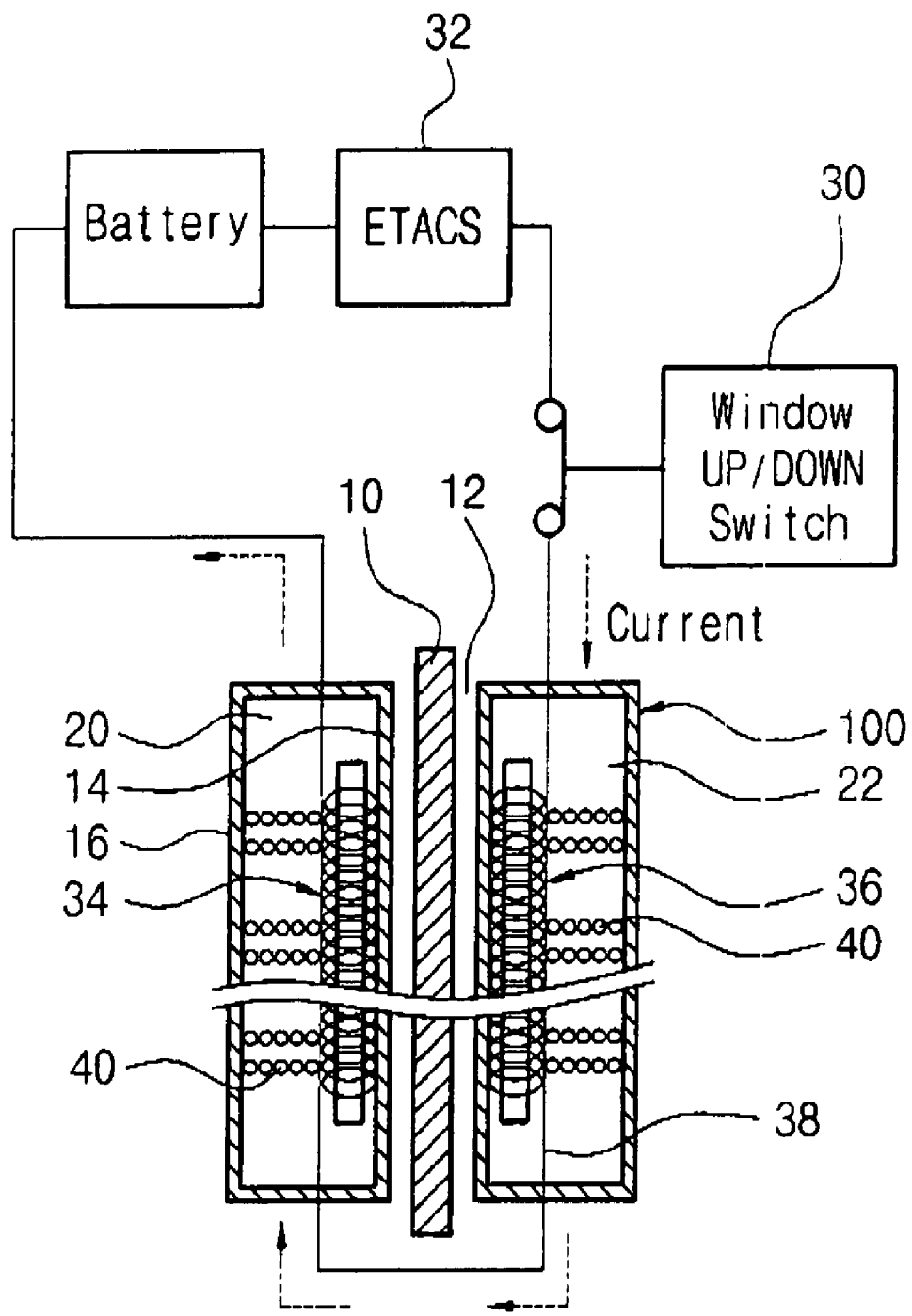

Now, the construction of another embodiment of the present invention will be described. FIG. 4 is a schematic front view illustrating a vehicle door in which a device for preventing noise from a window for vehicles is to be installed in accordance with this embodiment of the present invention, and FIGS. 6A and 6B schematically show the inner construction of the present invention and the connection relation between elements thereof in accordance with a second embodiment of the present invention. A first magnetic means 34 and a second magnetic means 36, each of which is an electromagnet having a coil wound therearound, are mounted at a first hollow part 20 and second hollow part 22 of the weatherstrip 100, respectively. In this case, to the first and second magnetic means 34 and 36 (the electromagnet) is connected a control means for enabling the supply of current thereto. A window UP/DOWN switch 30 and an ETACS (electronic time and alarm control system) 32 is sequentially connected to the second magnetic means 36. When the window UP/DOWN switch 30 is turned on, current from a battery is applied to the second magnetic means 36 under the control of the ETACS 32. The first and second magnetic means 34 and 36 are connected at their lower ends to each other by means of a conductive wire 38 to allow the current to flow from the second magnetic means 36 to the first magnetic means 34. Also, a plurality of springs 40 for resiliently pushing the first and second magnetic means 34 toward the window are attached at the first hollow part 20 and the second hollow part 22.

More specifically, the plurality of the springs 40 consist of a first group of springs disposed in the first hollow part 20 and a second group of springs disposed in the second hollow part 22. The first and second group of springs are integrally attached at one end to the inner surfaces of the opposite outside walls of the outer weatherstrip portion 14 and connected at the other end to the outer peripheral surface of the first and second magnetic means 34 and 36, respectively, and adapted to resiliently push the first and second magnetic means toward the window.

Figure 5A:
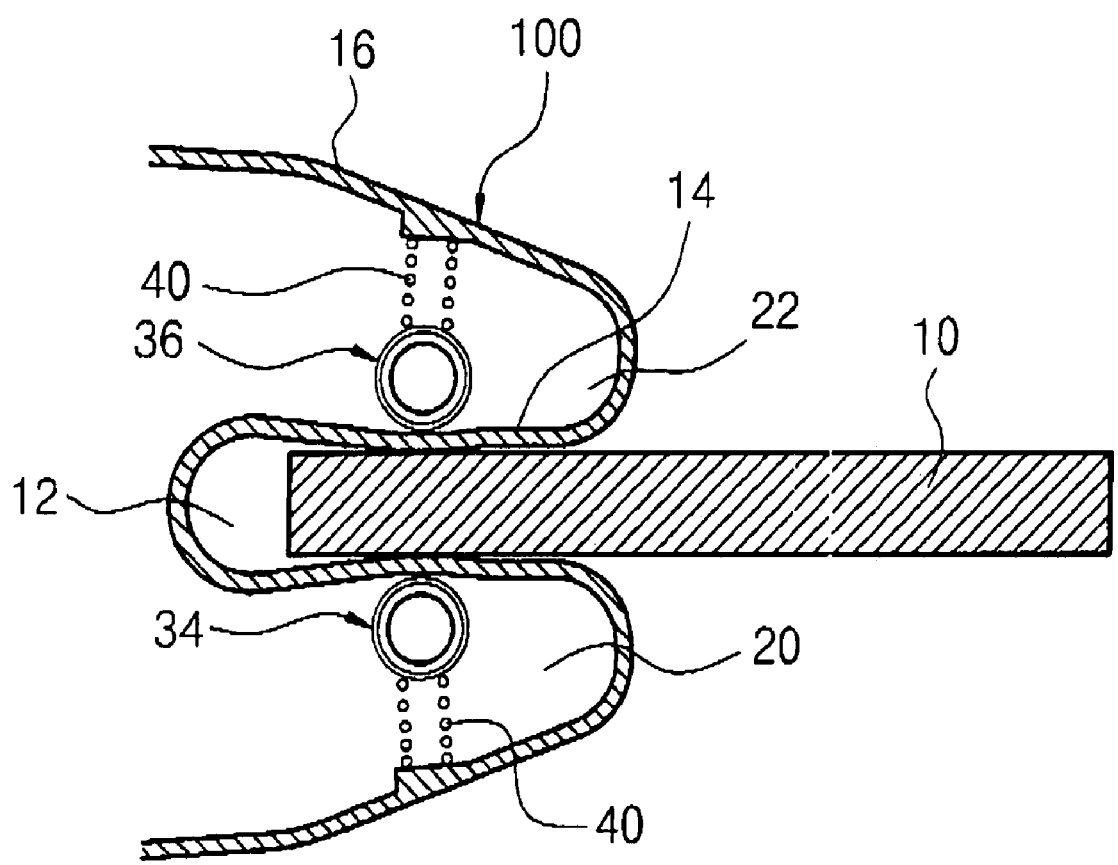
Figure 5B:
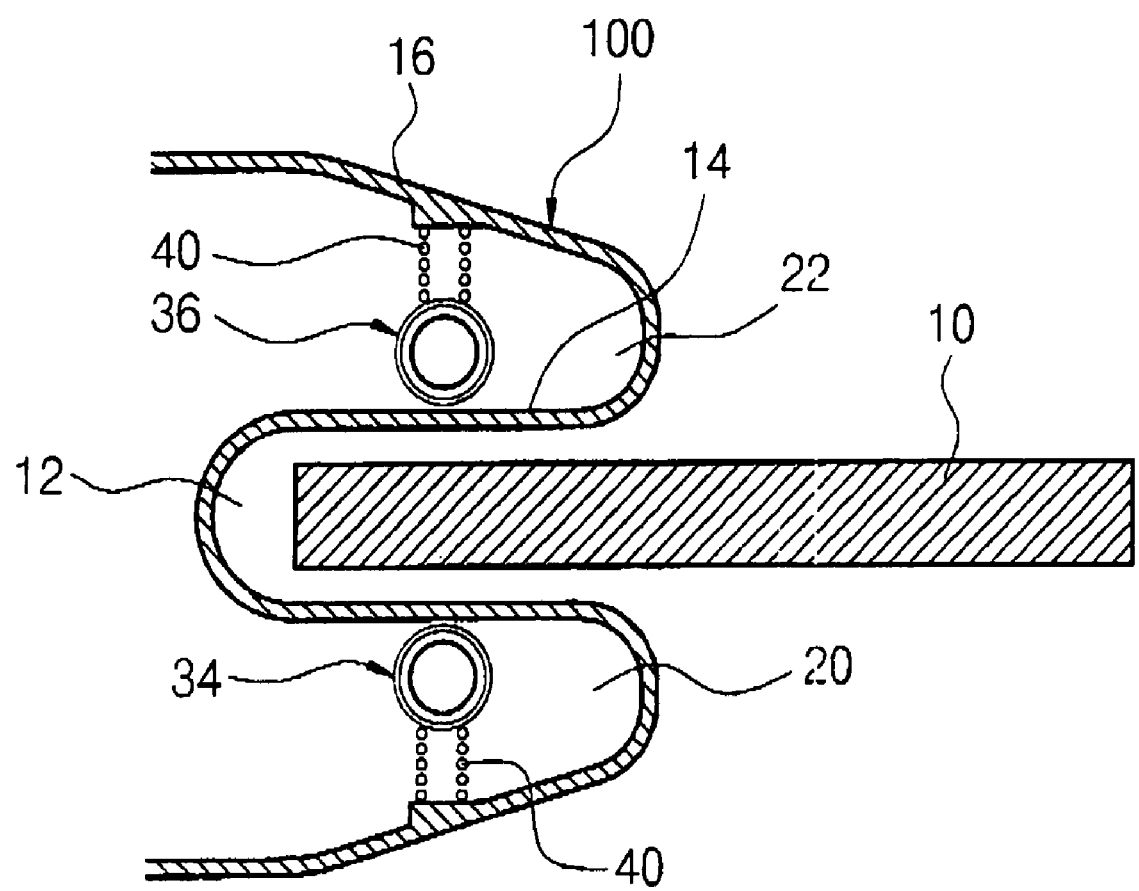

Now, the operation of this embodiment of the present invention will be described hereinbelow with reference to FIGS. 5A and 5B. FIGS. 5A and 5B are cross-sectional views taken along the line 5-5 of FIG. 4, wherein FIG. 5A is a view showing the present invention that is to be operated in an inactivated (or stopped) condition of a window, and FIG. 5B is a view showing the inventive device that is to be operated in an activated (or upwardly and downwardly moved) condition of a window. For the activated (moved) mode of the window 10, when a power window switch (e.g., the window UP/DOWN switch 30) is turned on, current from a battery is applied to the first and second magnetic means 34 and 36 under the control of the ETACS 32, at which time the current sequentially flows through the second magnetic means 36, the conductive wire 38, and then the first magnetic means 34. Since the direction of induced current and the line of magnetic force are perpendicular to each other by Fleming's right-hand rule, the line of magnetic force is arranged perpendicular to the direction of the current sequentially flowing from the first magnetic means 36 to the second magnetic means 34, so that the first magnetic means 34 and the second magnetic means 36 repel each other.

Subsequently, the first magnetic means 34 and the second magnetic means 36 repel each other by virtue of the electromagnetic force to resiliently compress the springs 40. Simultaneously, the two confronting inside walls of the inner weatherstrip portion 14 integrally attached with the first magnetic means and the second magnetic means 34 and 36 resiliently pull outwardly, respectively, to laterally widen the channel 12, so that the frictional contact between the two confronting inside walls of the inner weatherstrip portion 14 and the opposite inner and outer surfaces of the window 10 is avoided. Resultantly, the upward and downward movement of the window 10 is carried out without friction between the weatherstrip 100 and window 10, thereby preventing conventional frictional noise due to window rattling upon the upward and downward movement of the window 10.

For the inactivated (stopped) mode of the window 10, when the power window switch is turned off, the first and second magnetic means 34 and 36 are not supplied with current, so the compressed springs 40 are stretched to their original positions, causing the first and second magnetic means 34 and 36 to resiliently push the two confronting inside walls of the inner weatherstrip portion 14 toward the window 10. As a result, the two confronting inside wall surfaces of the inner weatherstrip portion 14 are brought into close contact with the opposite inner and outer surfaces of the window 10.

As described above, according to the device for and method of preventing noise from a door window glass for vehicles, a pair of magnetic means are installed within a weatherstrip in such a manner as to be positioned at the opposite lateral sides of an inner weatherstrip portion, which defines a channel for the upward and downward movement of the window to effect their mutual attractive or repulsive action. In an activated condition (i.e., upon the upward and downward movement of the window), the magnetic means pair resiliently pulls two confronting inside surfaces of the inner weatherstrip portion to enable smooth upward and downward movement of the window, thereby eliminating noise due to frictional contact between the window and the weatherstrip. In addition, in an inactivated or stopped condition, the magnetic means pair resiliently pushes the two confronting inside surfaces of the inner weatherstrip portion toward the opposite surfaces of the window to cause the confronting inside walls of the inner weatherstrip portion to be supportedly brought into close contact with the opposite surfaces of the window, thereby also eliminating noise due to window rattles caused by external factors such as wind, etc.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A device, comprising:
    a weatherstrip, comprising:
        an inner portion comprising an end wall;
        first and second inside walls extending from ends of the end wall parallel to each other, so that the end wall and the inside walls cooperatively define therebetween a channel for allowing a window to be upwardly and downwardly moved therealong;
        an outer portion comprising first and second outside walls outwardly extending from the inside walls;
        a first hollow part defined by the first inside wall and the first outside wall; and a second hollow part defined by the second inside wall and the second outside wall;

a first magnetic element mounted in the first hollow part;

a second magnetic element mounted in the second hollow part;

a controller, connected to the magnetic elements and adapted to provide a supply of electrical current to the magnetic elements; and at least one first resilient element disposed in the first hollow part, and at least one second resilient element disposed in the second hollow part, the resilient elements each being attached at a first end thereof to a respective one of the outside walls and connected at a second end thereof to a respective one of the magnetic elements, and resiliently push the respective one of the magnetic elements toward the window.

2. The device according to claim 1, wherein each of the first and second magnetic elements comprises an electromagnet.

3. The device according to claim 1, wherein the controller comprises a window switch and an electronic time and alarm control system (ETACS) sequentially connected to the second magnetic element; and a conductive wire via which the electrical current is applied to the second magnetic element under the control of the ETACS when the window switch is turned on, and said wire is adapted to electrically connect the first and second magnetic elements to each other.

4. A method of attenuating noise from a window in a door, the door including a weatherstrip having a first hollow part and a second hollow part positioned at opposite lateral sides of a channel defined by an inner portion of the weatherstrip, said channel allowing upward and downward movement of the door window therealong, a first magnetic element and a second magnetic element mounted in the first hollow part and the second hollow part, respectively, the method comprising:

when the door window is in an inactivated mode:
switching off current to the first and second magnetic elements, so that compressed springs resiliently push the first and second magnetic elements and inside walls of the inner weatherstrip portion toward the door window, bringing the inside walls into contact with surfaces of the door window; and when the door window is in an activated mode:
switching on the current to the first and second magnetic elements, the current sequentially flowing from the first magnetic element to the second magnetic element, such that a magnetic force generated by the current causes the first magnetic element and the second magnetic element to repel each other to resiliently compress the springs and to cause the inside walls of the inner weatherstrip portion to be resiliently pulled away from said door window laterally widening the channel, so that frictional contact between the inside walls of the inner weatherstrip portion and the surfaces of the door window is avoided.

* * * * *